United States Patent [19]

Delassus

[11] 4,021,602
[45] May 3, 1977

[54] CHANNEL FURNACE FOR MELTING METALS AND ALLOYS WITH A SINGLE INDUCTOR COIL ASSURING THE HEATING AND FORCED CIRCULATION OF THE MOLTEN METAL

[75] Inventor: Jean Delassus, Mornmorency, France

[73] Assignee: BBC Brown Boveri & Company Limited, Baden, Switzerland

[22] Filed: Mar. 5, 1976

[21] Appl. No.: 664,305

[30] Foreign Application Priority Data

Mar. 7, 1975 France .................. 75.07193

[52] U.S. Cl. .................................. 13/29
[51] Int. Cl.² ........................... H05B 5/14
[58] Field of Search .............. 13/26, 28, 29

[56] References Cited

UNITED STATES PATENTS

| | | | |
|---|---|---|---|
| 1,811,644 | 6/1931 | Northrup | 13/29 |
| 2,993,943 | 7/1961 | Cooke | 13/29 |
| 3,192,303 | 6/1965 | Olsson | 13/29 X |

Primary Examiner—R. N. Envall, Jr.
Attorney, Agent, or Firm—Toren, McGeady and Stanger

[57] ABSTRACT

A channel furnace for the melting of metals and alloys, of the kind comprising an inductor device for the heating and the unidirectional forced circulation of the molten metal in the channel. The inductor includes a single coil 10 formed of two layers of conductors wound along helices whose axial pitch is equal to the axial length of the coil for one half-turn of winding. The coil is divided into $n$ pairs ($n$ 3) of circuits of $m$ turns each, regularly distributed over the periphery of the coil, the two circuits of each pair being derived one from the other by a rotation of 180° about the axis of the coil and being series-connected together additively from the point of view of the axial component of the magnetic flux which they generate. The pairs are shifted in angle by $2\pi/n$ about the axis of the coil so as to form $n$ phases shifted by $2\pi/n$.

7 Claims, 11 Drawing Figures

CHANNEL FURNACE FOR MELTING METALS AND ALLOYS WITH A SINGLE INDUCTOR COIL ASSURING THE HEATING AND FORCED CIRCULATION OF THE MOLTEN METAL

BACKGROUND OF THE INVENTION

The present invention relates to a channel furnace for melting metals and alloys, and it concerns, more particularly, in such a furnace, a new type of single-coil inductor which assures both the heating and the forced circulation of the molten metal inside the channel of the furnace.

Already realized have been channel furnaces where each individual furnace comprises a melting tank, at least one heat-insulated duct which under the tank forms a loop situated in a vertical or oblique plane, and whose inner channel connects one heating inductor formed by an iron core transformer passing across the loop of the channel. Around the iron core of the transformer, this type of furnace comprises an excitation coil which constitutes the primary of the transformer. The secondary, having a single turn, is formed by the loop of liquid metal contained in the channel and being closed by the tank located above the channel.

Thus, the flow of an alternating current in the primary coil generates, by induction, a secondary alternating current in the loop of the channel, thereby producing development of heat by Joule effect.

This known arrangement of the channel furnace presents the following two disadvantages. On the one hand, the electric resistance of the secondary circuit is localized mainly in a long and narrow channel, while the molten metal contained in the tank offers a very wide cross-section to the flow of the current. It results therefrom that the electric heating power is released mainly in the channel and not in the tank, causing overheating of the metal contained in the channel. On the other hand, the electrodynamic stresses due to the flow of the heating current are perpendicular to the direction of this current and are exerted in a direction transverse to the longitudinal direction of the channel, thus producing turbulent movements which are undesirable as they cause wear of the refractory walls of the channel.

To remedy these disadvantages, it has been proposed to arrange an additional inductor inside or outside the loop of the channel. This inductor is formed by a polyphase winding generating a rotating field capable of producing a forced circulation of the molten metal inside the channel. It will be noted that, with a single heating inductor coil, one could already observe a certain circulation of molten metal inside the channel, but the origin of this circulation, which is generally very slow, was not well known. It was generally supposed that this very slow circulation was due mainly to the inevitable assymmetries of construction of the channel and to the secondary effects of the electrodynamic stresses due to the flow of the heating current. In any event, this very slow circulation was not sufficient to remedy the above-mentioned two disadvantages, so that it proved necessary to provide, as indicated above, an additional polyphase inductor to produce a relatively rapid forced circulation of the molten metal inside the channel.

However, when the additional polyphase inductor is arranged with the heating inductor between the core of the transformer and the loop of the channel as is generally the case, there results the disadvantage that one of the two field magnets which is situated between the other inductor and the channel forms an electromagnetic shield which reduces the magnetic coupling of the other inductor with the channel. This increases the active and reactive electrical losses and reduces the efficiency of the furnace. Besides, since the space available for accommodating the inductor or inductors inside the loop of the channel is relatively small, the fact of providing an additional inductor necessitates reducing the size of the inductor provided for the heating, thus entailing a reduction of the available heating power, and consequently of the capacity of the furnace, unless the overall dimensions of the latter are increased.

OBJECTS OF THE INVENTION

The present invention has, as an object, the remedy of the disadvantages of the above described former channel furnaces, by providing a new type of inductor with a single coil, to assure both the heating and unidirectional forced circulation of the molten metal in the channel, owing to a double configuration of magnetic fields. One of these fields is alternating in the axial direction of the core of the transformer and inducing the heating current; the other field being radial, rotating relative to the core of the transformer, and inducing the currents which produce said forced circulation.

The present invention also has for its object the provision of a combined heating and forced circulation inductor, which comprises a single coil of relatively small size and whose conductors can easily be cooled, so as to permit the realization of a furnace of great capacity and relatively small dimensions.

SUMMARY OF THE INVENTION

In accordance with the present invention, a channel furnace is of the above type having a melting tank, at least one heat insulating duct which forms a loop below the tank situated in a vertical or oblique plane and having an inner channel connecting at least two different zones of the bottom of the tank, an inductor device for the heating and the unidirectional forced circulation of the molten metal in the channel, the inductor device consisting of a transformer with iron core passing across the loop of the channel and two alternating current sources, one of which is a source of polyphase current. The inductor device comprises a single coil per looped duct, formed of two layers of conductors wound along helices whose axial pitch is equal to the total axial length of the coil for one half-turn of winding, the helical conductors of both layers forming two crossed families of conductors and being connected together to form a series wave winding. The coil is divided into $n$ pairs ($n \geq 3$) of circuits of $m$ turns each, regularly distributed over the periphery of the coil. The two circuits of each pair are derived one from the other by a rotation of 180° about the axis of the coil and are series-connected together additively from the point of view of the axial component of the magnetic flux which they generate. The pairs are shifted in angle by $2\pi/n$ about the axis of the coil so as to form $n$ phases shifted by $2\pi/n$ and each having an input, an output and a center tap. The $n$ inputs are connected together at a first terminal and the $n$ outputs are connected together at a second terminal. Both current sources comprise a source of single-phase heating current, which is connected to the aforesaid two terminals, and a source of $n$-phase circulation current whose $n$ phases are connected respectively at the $n$ center taps of the $n$ phases of the coil.

As a result of the arrangement, the single coil generates both single-phase circular currents for heating and polyphase currents assuring a forced circulation of the molten metal in the channel.

For a better understanding of the present invention, together with other and further objects thereof, reference is made to the accompanying drawings and following detailed description, while the scope of invention is pointed out in the appended claims.

DETAILED DESCRIPTION OF THE INVENTION

Figure 2:
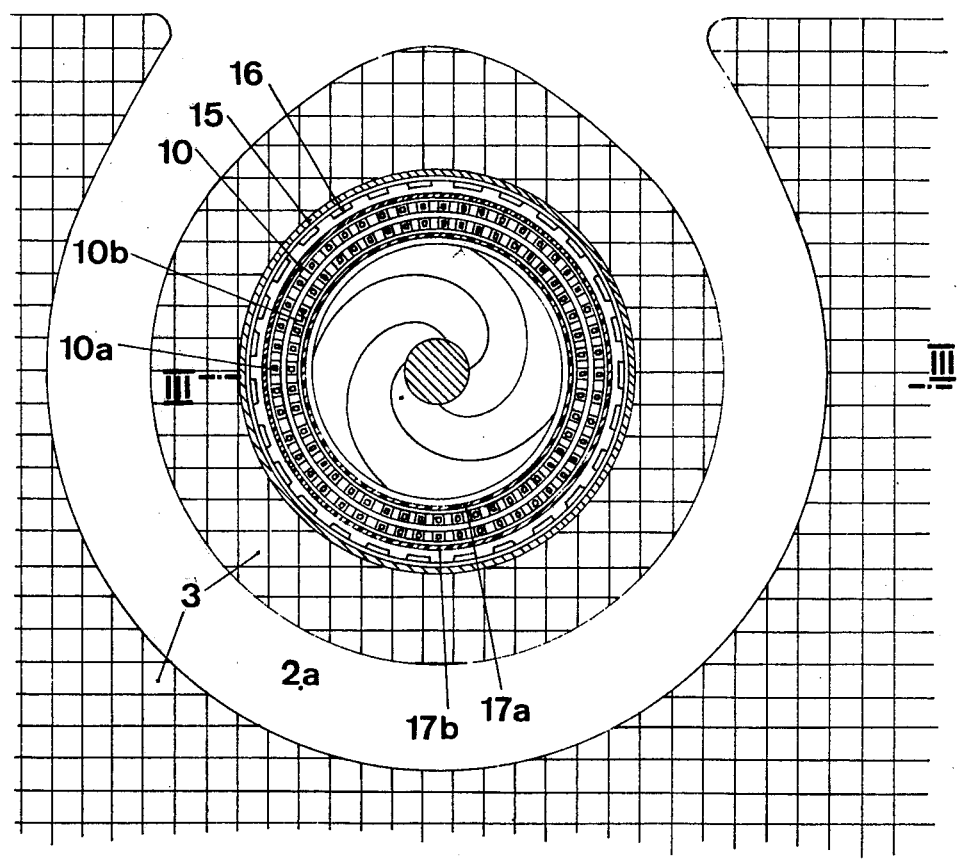
FIG. 2 is a partial view, in vertical section and on a larger scale, showing the lower portion of the channel furnace represented in FIG. 1, with the looped channel and the associated single-coil inductor.
Figure 3:
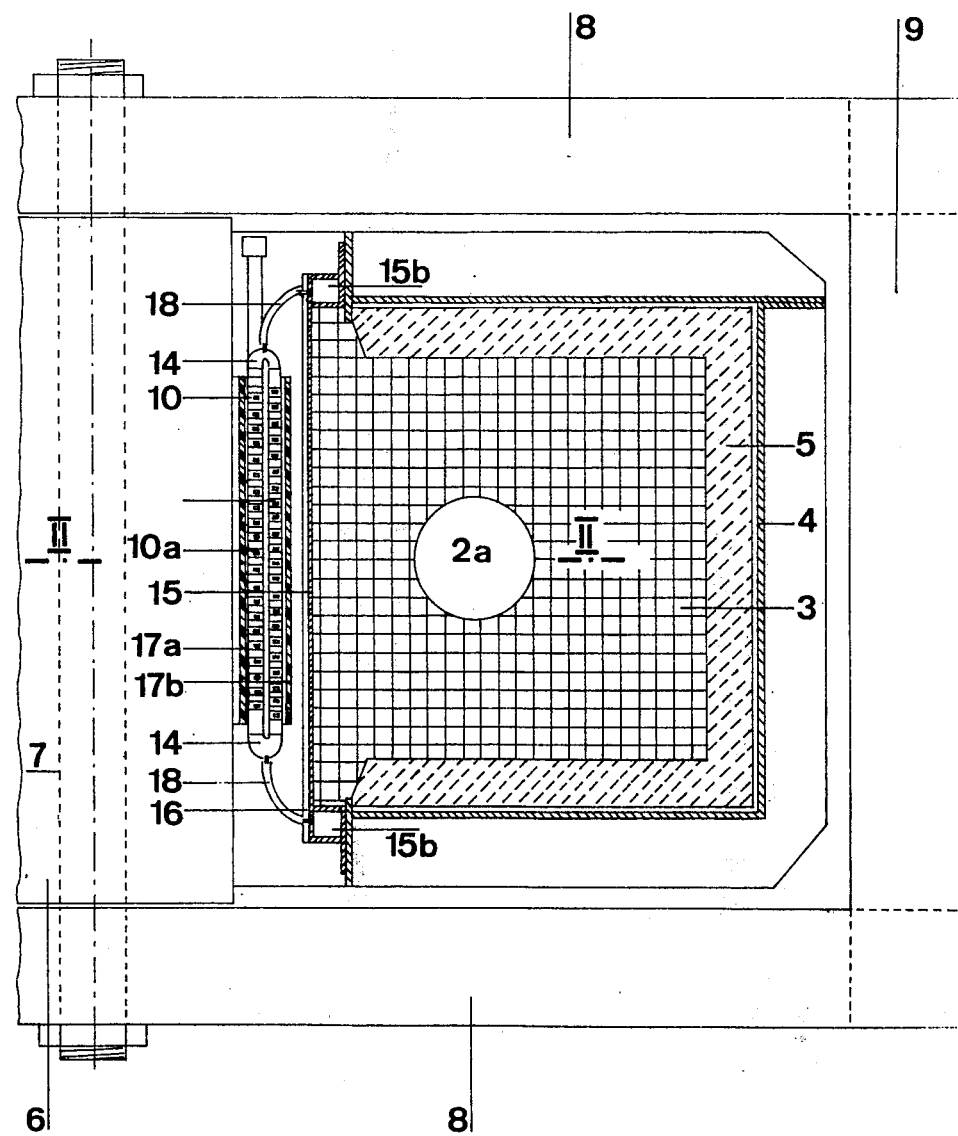
FIG. 3 is a partial view in section along line III—III of FIG. 2.

The channel furnace according to the present invention, which is represented schematically in FIG. 2, comprises, in a known manner, a melting tank 1, whose walls, of great thickness, are made of a refractory material, and which presents a substantially horizontal flat bottom 1a below tank 1. A duct 2 with refractory walls is arranged so as to form a loop in a substantially vertical plane. The duct 2 has ends of the inner channel 2a of this duct opening into different zones of the bottom 1a of the tank, notably into diametrically opposite zones of the bottom 1a if tank 1 is cylindrical. The refractory walls of duct 2 are formed, for example, in a known manner, by an assembly 3 of rings of concrete, the rigidity of the assembly being assured by an outer metal casing 4 internally lined with refractory bricks 5. A magnetic core 6 passes across the central orifice of the loop formed by duct 2. In the form of the invention, this magnetic core 6 is constituted, as can be seen notably in FIGS. 2 and 3, by radial laminations 6a, preferably in the form of an involute of a circle, which are supported by a central core 7 (in FIG. 2, only a small number of laminations 6a has been shown so as not to overload the figure, but it is evident that the number of laminations is much greater and that each lamination is in contact by its two faces with the adjacent laminations).

The magnetic core 6 is completed by two yokes 8, of a laminated magnetic material and perpendicular to core 6, and by two columns 9, also of a laminated magnetic material, so as thereby to form a closed magnetic circuit. An inductor winding 10 is wound round the magnetic core 6. In the embodiment, this inductor winding is composed of two layers or courses of superposed wires 10a and 10b, protected by inner and outer insulating shields 17a and 17b, respectively, which are arranged concentrically to the two superposed layers 10a and 10b. A rim of non-magnetic metal 15, cooled by circulation of water, is interposed between the concrete 3 and the inductor winding 10. The conductor wires forming the inductor winding 10 preferably consist of hollow conductors connected together at the two ends of the coil by similarly hollow connections 14, according to a winding scheme which will be described in detail later on. The winding 10 formed by the hollow conductors is cooled by a liquid. For this purpose, as FIG. 3 more particularly shows, at least some of the hollow connections 14 are provided with connection tubings permitting the connection of the hollow conductors of winding 10, by means of tubes 18 of insulating material, to two manifolds 15a and 15b which are respectively fastened to the ends of the rim 15. Manifold 15a is, for example, a distribution manifold permitting the supply of the conductors of the winding with cooling liquid coming from a cooling liquid source not shown, for example a source of cold water. The manifold 15b may be, for example, a discharge manifold for the cooling liquid. The rim 15 of the non-magnetic metal is cooled by water pipes 16, provided on its inner face and fed with cold water for example, by manifold 15a.

Figure 5:
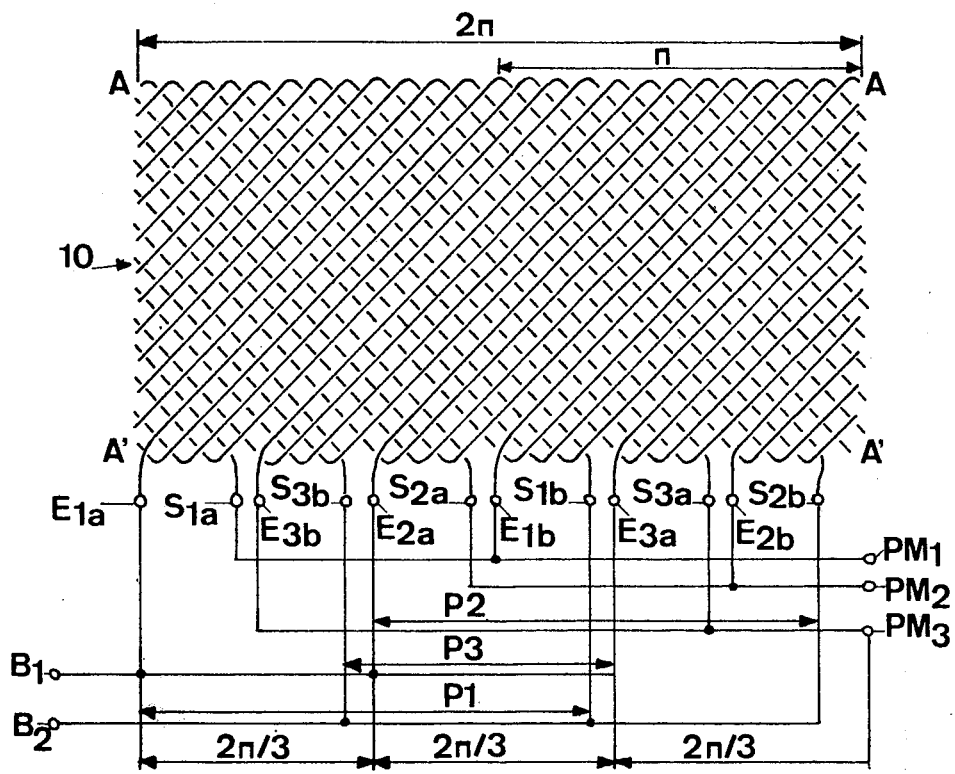
FIG. 5 is a schematically developed flat view, on a larger scale, of the coil represented in FIG. 4.
Figure 4:
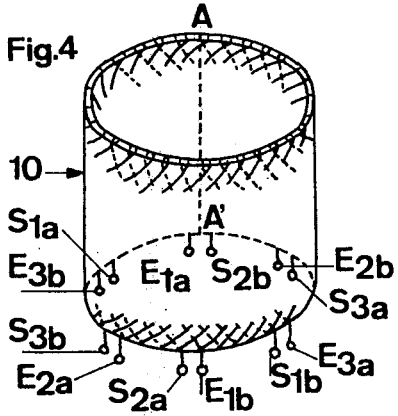
FIG. 4 is a view in perspective of an inductor coil according to the present invention.
Figure 6:
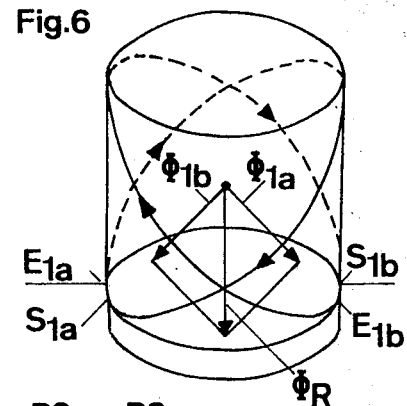
FIG. 6 is a schematic view in perspective intended to explain how the circuits composing a coil represented in FIGS. 4 and 5 are connected together.

According to the present invention, the single inductor winding 10 assures both the heating and the circulation of the molten metal inside channel 2a, owing to a winding scheme which will now be described with reference to FIGS. 4 to 6. In FIG. 4, the winding of the inductor is shown in perspective. In FIG. 5, the winding is shown and developed flatwise after opening along the line A-A', shown in FIG. 4. In FIG. 5, the conductor wires which form the outer layer or course 10a (FIGS. 2 and 3) are represented in solid lines, while the conductors which form the inner layer 10b (FIGS. 2 and 3) are represented in broken lines.

Figure 7:
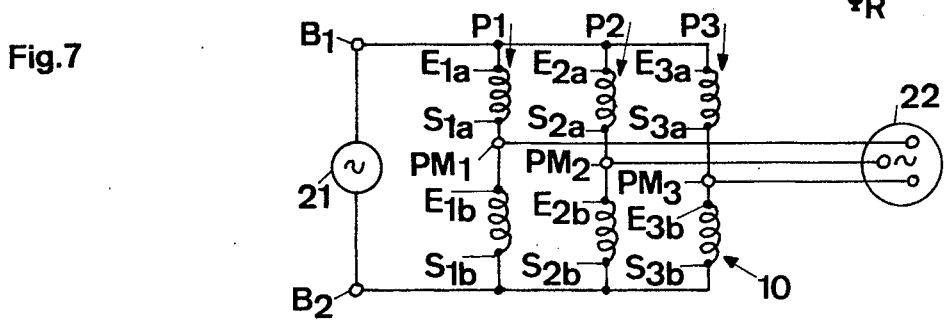
FIG. 7 is a circuit diagram showing how the coil represented in FIGS. 4 and 5 is connected to a source of single-phase alternating heating current and to a source of three-phase alternating current for the forced circulation of the molten metal.

As can be seen in FIG. 4 and 5, the conductors of the two layers are wound along helices whose axial pitch is equal to the total length of the coil for one half-turn of winding, the helical conductors of both layers forming two crossed families of conductors and being connected together to form a series wave winding. In the form of realization here considered, and as FIGS. 5 and 7 show more particularly, coil 10 is divided into three pairs of circuits of four turns each. Each circuit comprises an input and an output. Thus, the first circuit of the first pair has an input $E_{1a}$ and an output $S_{1a}$, while the second circuit of the first pair comprises an input $E_{1b}$ and an output $S_{1b}$. Likewise, $E_{2a}$ and $E_{2b}$ designate the respective inputs of the first and of the second circuit of the second pair, and $S_{2a}$ and $S_{2b}$ designate the respective outputs of these same circuits. Lastly $E_{3a}$ and $E_{3b}$ designate the respective inputs of the first and second circuits of the third pair, and $S_{3a}$ and $S_{3b}$ the outputs of these same circuits. As FIGS. 4, 5 and 6 show more particularly, the above stated diverse circuits are regularly distributed over the periphery of the coil and the two circuits of each pair derive one from the other by a rotation of 180° about the axis of the coil. Besides, the two circuits of each pair are series-connected together additively from the point of view of the axial component of the magnetic flux which they generate. This is clearly evident from FIG. 6 in which only the first and second circuits of the first pair have been represented, each of these two circuits being shown to comprise only a single turn for reasons of simplification. As can be seen in this FIG. 6, if, at a given moment, the current in the two circuits circulates in the direction indicated by the arrows, it can be seen that the fluxes $\Phi_{1a}$ and $\Phi_{1b}$ generated by the two circuits add up so that the resultant $\Phi_R$ of these two fluxes is directed along the axis of the coil.

Coming back to FIGS. 4 and 5, it is seen that the pairs of circuits are shifted in angle by $2\pi/3$ about the axis of the coil so as to form three phases shifted by $2\pi/3$, each phase having an input $E_{1a}$, $E_{2a}$ or $E_{3a}$, respectively, an output $S_{1b}$, $S_{2b}$, respectively, and a center tap $PM_1$, $PM_2$, respectively. The inputs $E_{1a}$, $E_{2a}$ and $E_{3a}$ of the three phases are connected together at a common terminal $B_1$, while the outputs $S_{1b}$, and $S_{2b}$ and $S_{3b}$ of the three phases are connected together at another common terminal $B_2$. When connecting together the above-mentioned inputs or outputs, care must be taken that the connecting wire used for this purpose does not make a complete turn so as not to create a short-circuited spiral.

As FIG. 7 shows, a single-phase alternating current source 21 is connected between the terminals $B_1$ and $B_2$. This source 21 may, for example, be constituted by a phase of the a.c. supply network. As will be seen later on, the current produced by this source and flowing through the various circuits of coil 10 is intended to assure the heating of the molten metal in the channel, by induction of a single-phase heating current in the metal loop formed by the molten metal contained in channel 2a of the furnace. On the other hand, there is provided a source 22 of three-phase alternating current whose three phases are respectively connected to the center taps $PM_1$, $PM_2$ and $PM_3$ of the three phases of coil 10. The three-phase source 22 may, for example, be constituted by a three-phase alternator driven in rotation by a motor whose speed of rotation can be adjusted so as to vary the frequency of the three-phase alternating current produced by the alternator. As will be seen below, this three-phase current is intended to create a rotating field capable of producing a forced circulation of the molten metal in channel 2a of the furnace. The two sources 21 and 22 do not feed one into the other. In fact, since the six circuits are identical, they form a kind of balanced bridge with six branches. The points $B_1$ and $B_2$ constitute neutral points in which the currents delivered in the three phases by source 22 cancel each other out at all times, so that no current coming from source 22 traverses source 21. Likewise, the center taps $PM_1$, $PM_2$, and $PM_3$ are equipotential points vis-a-vis the current delivered by source 21. Consequently, no current coming from source 21 passes through source 22. The two sources 21 and 22 are therefore totally independent.

The essential property of the coil of the inductor 10 according to the present invention, which has been described above in connection with FIGS. 4 to 7, is that the current which flows through each conductor possesses both a circular component and an axial component, which are, respectively, the projections of the current vector in the two directions considered. Also, the resultant current, due to the action of the two superposed layers, can be obtained as the vectorial sum of the component currents. If the component currents belong to the same circuit, they are equal in absolute value, but, as is evident from FIG. 6, one circulates on an ascending helix and the other on a descending helix, so that their circular components add up and and their axial components cancel out. It results therefrom that, when the currents are equal in the six circuits, only spirals of circular currents remain on the whole, the total number of which is equal to the total number of turns of the coil, and that the wave effect of the winding is zero. The total of the axial components of the magnetic flux produced by these spirals of circular current adds up to induce a single-phase alternating heating current in the loop of molten metal contained in channel 2a of the furnace. The number of conductors of the coil is chosen so as to obtain sufficient induction for the induced heating current to maintain the molten metal at a temperature at least equal to the melting temperature of said metal or of the metal alloys contained in the melting tank.

Figure 8:
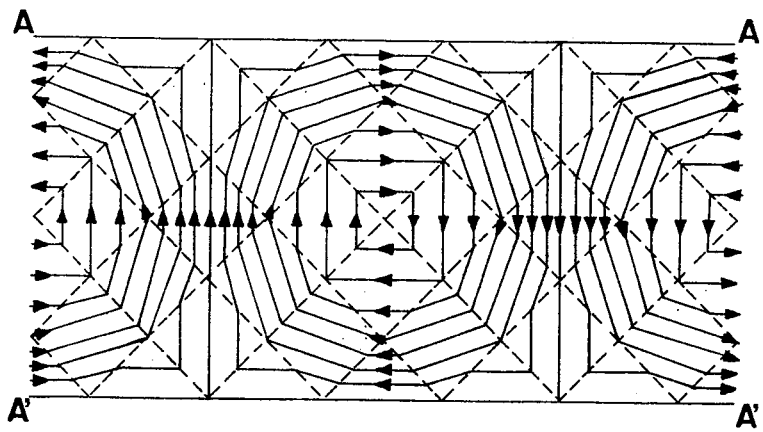
FIG. 8 is a view showing, at a given instant, the configuration of the three-phase currents at the periphery of the coil of the inductor according to the invention.
Figure 9:
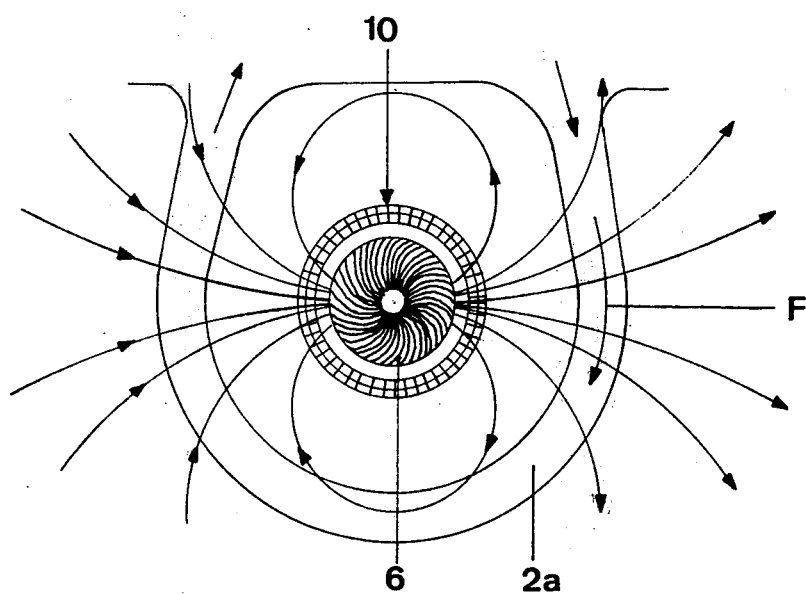
FIG. 9 is a partial schematic view of the lower portion of the channel furnace, showing the configuration of the rotating magnetic field which produces the forced circulation of the molten metal in the channel of the furnace.

On the other hand, if, at a point of the peripheral surface of the coil, the component currents are different because the crossing conductors belong to two different phases of the coil, then the direction and the amplitude or intensity of the resultant current vector varies at each instant as a function of the variations of the component currents, and this current vector forms a vector rotating at the frequency of the currents circulating through the coil. Starting with the local current vector, it is possible, by joining these vectors to obtain the general configuration of the resultant currents on the coil. One thus obtains, as is shown in FIG. 8, an assembly of lines closed around two diametrically opposed points which form a North pole and a South pole, respectively, on the surface of the cell. The flux of the lateral bipolar, i.e. radial, field thus created is perpendicular to the axial flux whose variations induce the heating current. The lines of flux of this bipolar lateral field are shown in FIG. 9. As this flux rotates, for example, in the direction of arrow F (FIG. 9), relative to the core 6 of the inductor, this core must be made, as stated above, by means of radial magnetic laminations, for example, by means of laminations in the form of circular involutes.

Figure 1:
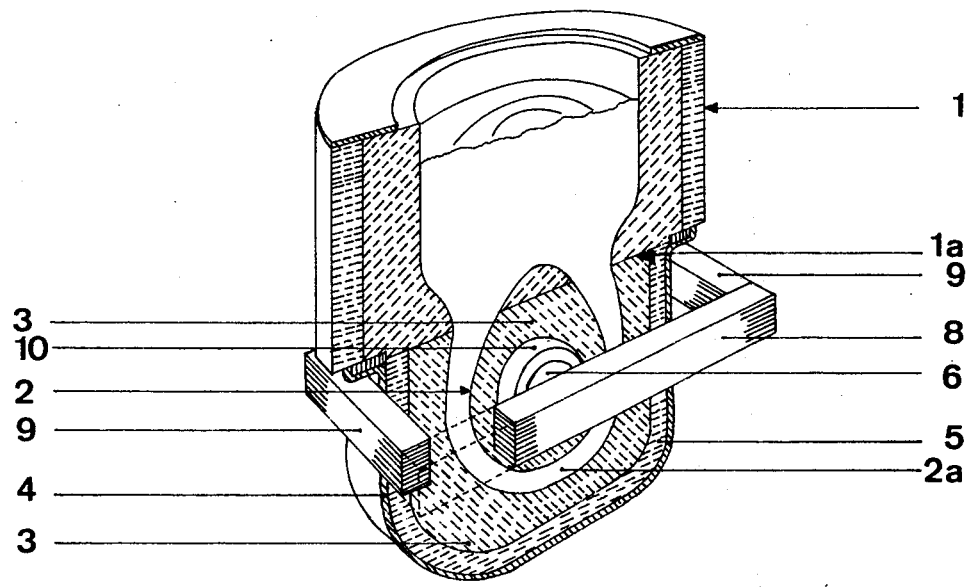
FIG. 1 is a view, partly in vertical section, showing the general structure of a first type of channel furnace in which the present invention can be employed.
Figure 10:
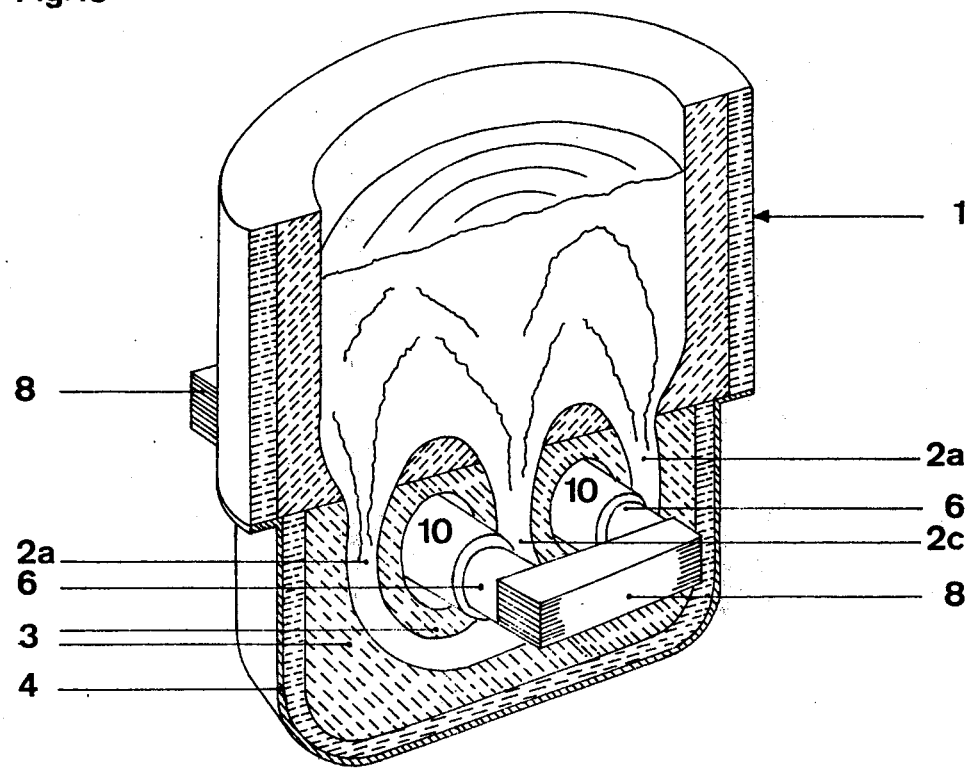
FIG. 10 is a view analogous to FIG. 1, showing another type of furnace comprising two looped channels, with an inductor according to the present invention per channel.
Figure 11:
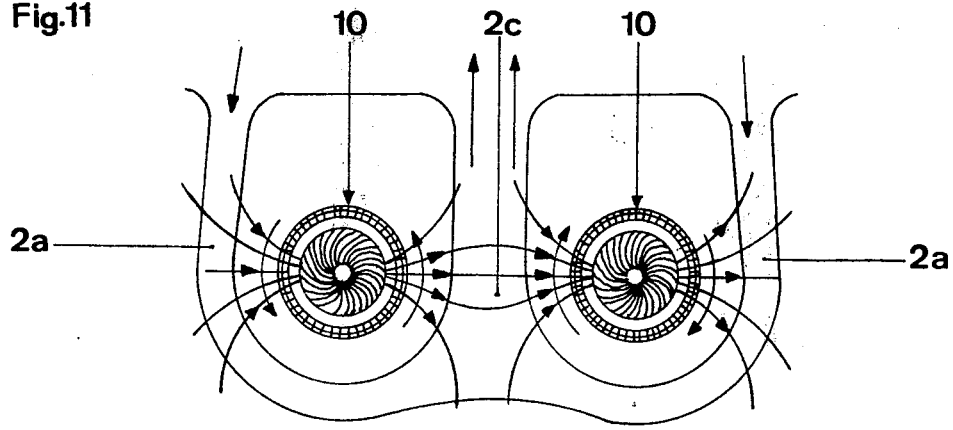
FIG. 11 is a view analogous to FIG. 9 showing the arrangement of the rotating magnetic field generated by the two inductors of the channel furnace shown in FIG. 10.

FIG. 10 shows a variant of a melting tank, of a known type, in which the present invention can also be employed. In this embodiment, the elements which are identical with or which have the same function as, those already described in connection with the first form of construction, are designated by the same reference numbers. Below tank 1 are arranged two ducts in the form of a loop, whose inner channels 2a and 2b, respectively, are arranged substantially in a vertical plane and comprise a common portion 2c. In this embodiment considered, there are provided two magnetic cores 6 with magnetic laminations which are radial or involutes of a circle. Each core 6 passes across a loop of a channel 2a or 2b, respectively, and the two cores 6 are connected together by two yokes 8 so as to close the magnetic circuit. On each core 6, an inductor 10 is wound whose coil has a similar structure as that described in connection with FIGS. 2 to 7. The two coils are moreover arranged in such a way that the forced circulations of molten metal which they produce in the channels 2a and 2b, respectively, take place in the same direction in the portion 2c common to both channels. For example, if, as FIG. 11 shows, the rotating field created by coil 10 associated with the channel 2a rotates counterclockwise, the coil 10 associated with the channel 2b must be arranged in such a way that the rotating field which it generates rotates clockwise. Under these conditions, the molten metal will circulate in the two channels 2a and 2b in the direction indicated by the arrows in FIG. 11, that is, in the example considered upwardly in the common portion 2c. Naturally, if desired, the arrangement of the two coils 10c could be reversed so that the circulation of the molten metal in the common portion 2c occurs downwardly.

It should be understood that the embodiments which have been described above have been given as purely indicative and in no way limited examples, and that numerous modifications can be made without going beyond the scope of the present invention. Thus notably each coil 10 may be subdivided into more than three pairs of circuits, and each circuit may comprise more than four turns or fewer than four turns. In the general case, coil 10 may be subdivided into $n$ pairs ($n \geq 3$) of circuits each comprising $m$ turns ($m \geq 1$). Thus there may be chosen for example $n = 6$; in that case, coil 10 will comprise six phases and the source 22 should be a source of six-phase alternating current.

What is claimed is:

1. A channel furnace for the melting of metals and alloys, of the type having a melting tank, at least one heat-insulated duct which forms below the tank a loop situated in a vertical or oblique plane, and whose inner channels connects at least two different zones of the bottom of said tank, an inductor device for the heating and the unidirectional forced circulation of the molten metal in the channel, said inductor device consisting of a transformer with iron core passing across the loop of the channel, and two alternating current sources, one of which is a source of polyphase current, for feeding the inductor device, the improvement being that this inductor device comprises a single coil per looped duct, formed of two layers of conductors would along helices whose axial pitch is equal to the axial length of the coil for one half-turn of winding, the helical conductors in both layers forming two crossed families of conductors and being connected together to form a series wave winding, said coil being divided into $n$ pairs ($n \geq 3$) of circuits of $m$ turns each, regularly distributed over the periphery of the coil, the two circuits of each pair being derived one from the other by a rotation of 180° about the axis of the coil and being connected together in series additively from the point of view of the axial component of the magnetic flux which they generate, and said pairs being shifted in angle by $2\pi/n$ about the axis of the coil so as to form $n$ phases shifted by $2\pi/n$ and each having an input, an output, and a center tap, the $n$ inputs being connected together at a at a second terminal, and in that the two current sources comprise a source of single-phase heating current, which is connected to the aforesaid two terminals, and a source of $n$-phase circulation current whose $n$ phases are connected respectively at the $n$ center taps of the $n$ phases of the coil.

2. Channel furnace according to claim 1, wherein the inductor comprises a magnetic core with laminations which are radial.

3. Channel furnace according to claim 1, wherein the inductor comprises a magnetic core with laminations which are in the form of circular involutes.

4. Channel furnace according to claim 1, wherein the coil of the inductor comprises three pairs of circuits, and in that the source of polyphase current is a three-phase source.

5. Channel furnace according to claim 4, wherein the source of three-phase current is a three-phase alternator driven in rotation at an adjustable speed.

6. Channel furnace according to claim 1, wherein the conductors of the coil are hollow and transversed by a cooling fluid.

7. Channel furnace according to claim 1, wherein two looped ducts which are situated in a same plane and whose respective channels have a common portion are provided, and wherein the inductor device includes two coils each arranged in the loop of a respective duct, the two coils being adapted so that the forced circulations of molten metal which they produce take place in the same direction in said portion common to both channels.

* * * * *